(12) United States Patent
Douglass

(10) Patent No.: US 12,665,409 B2
(45) Date of Patent: Jun. 23, 2026

(54) OPTICS-BASED REMOTE MONITORING OF PROTECTION DEVICES

(71) Applicant: Eaton Intelligent Power Limited, Dublin (IE)

(72) Inventor: Robert Stephen Douglass, Wildwood, MO (US)

(73) Assignee: EATON INTELLIGENT POWER LIMITED, Dublin (IE)

( * ) Notice: Subject to any disclaimer, the term of this patent is extended or adjusted under 35 U.S.C. 154(b) by 164 days.

(21) Appl. No.: 18/601,446

(22) Filed: Mar. 11, 2024

(65) Prior Publication Data

US 2025/0286362 A1 Sep. 11, 2025

(51) Int. Cl.
H02H 3/04 (2006.01)
G08B 21/18 (2006.01)

(52) U.S. Cl.
CPC .......... H02H 3/046 (2013.01); G08B 21/185 (2013.01)

(58) Field of Classification Search
None
See application file for complete search history.

(56) References Cited

U.S. PATENT DOCUMENTS

| | | | |
|---|---|---|---|
| 5,390,065 A * | 2/1995 | Allina | H02H 3/048 |
| | | | 116/DIG. 5 |
| 5,559,662 A | 9/1996 | Happ | |
| 6,366,724 B1 * | 4/2002 | Jennings | H04B 10/00 |
| | | | 372/38.1 |
| 8,094,424 B2 * | 1/2012 | Cornelius | H01H 85/30 |
| | | | 361/93.1 |
| 9,063,001 B2 * | 6/2015 | Yee | G01J 1/02 |
| 10,439,733 B2 * | 10/2019 | Sluz | H04B 10/0795 |

* cited by examiner

*Primary Examiner* — K. Wong
(74) *Attorney, Agent, or Firm* — Eckert Seamans Cherin & Mellott, LLC

(57) ABSTRACT

A device includes a light source configured to emit light as an indication that an electrical protection device has operated. The electrical protection device is configured to operate in response to a fault condition detected on an energized conductor to which the electrical protection device is electrically coupled. The device further includes an optical device coupled to the light source and configured to channel the emitted light from a first end portion of the optical device to a second end portion of the optical device, and a photosensor optically coupled to the second end portion of the optical device and configured to detect the emitted light.

18 Claims, 4 Drawing Sheets

OPTICS-BASED REMOTE MONITORING OF PROTECTION DEVICES

TECHNICAL FIELD

This disclosure relates generally to protection devices, and, more specifically, to optics-based remote monitoring of protection devices.

BACKGROUND

An electrical distribution system, such as an electrical grid, may be used to distribute electricity over a region or within a facility, such as from upstream power transmission infrastructure to one or more downstream users or distributors of the electricity. At various points within such a grid, electricity may be provided at a higher voltage at an upstream location but at a lower voltage for the downstream user or distributor. Upon delivery of the electricity to a site, such as a commercial site or industrial site, distribution and management of the delivered electricity may be controlled and managed by a large number of electrical distribution panels. In some instances, fault currents may occur on the electrical distribution system that can result in a fault condition, such as an overcurrent or overvoltage fault condition. Under such a fault condition, protection devices may operate to clear the fault currents. Once operated, certain protection devices may be suited to be replaced. However, identifying the protection devices that are suitable for replacement may be time-consuming and cumbersome.

DESCRIPTION OF EXAMPLE EMBODIMENTS

Overview

Figure 1:
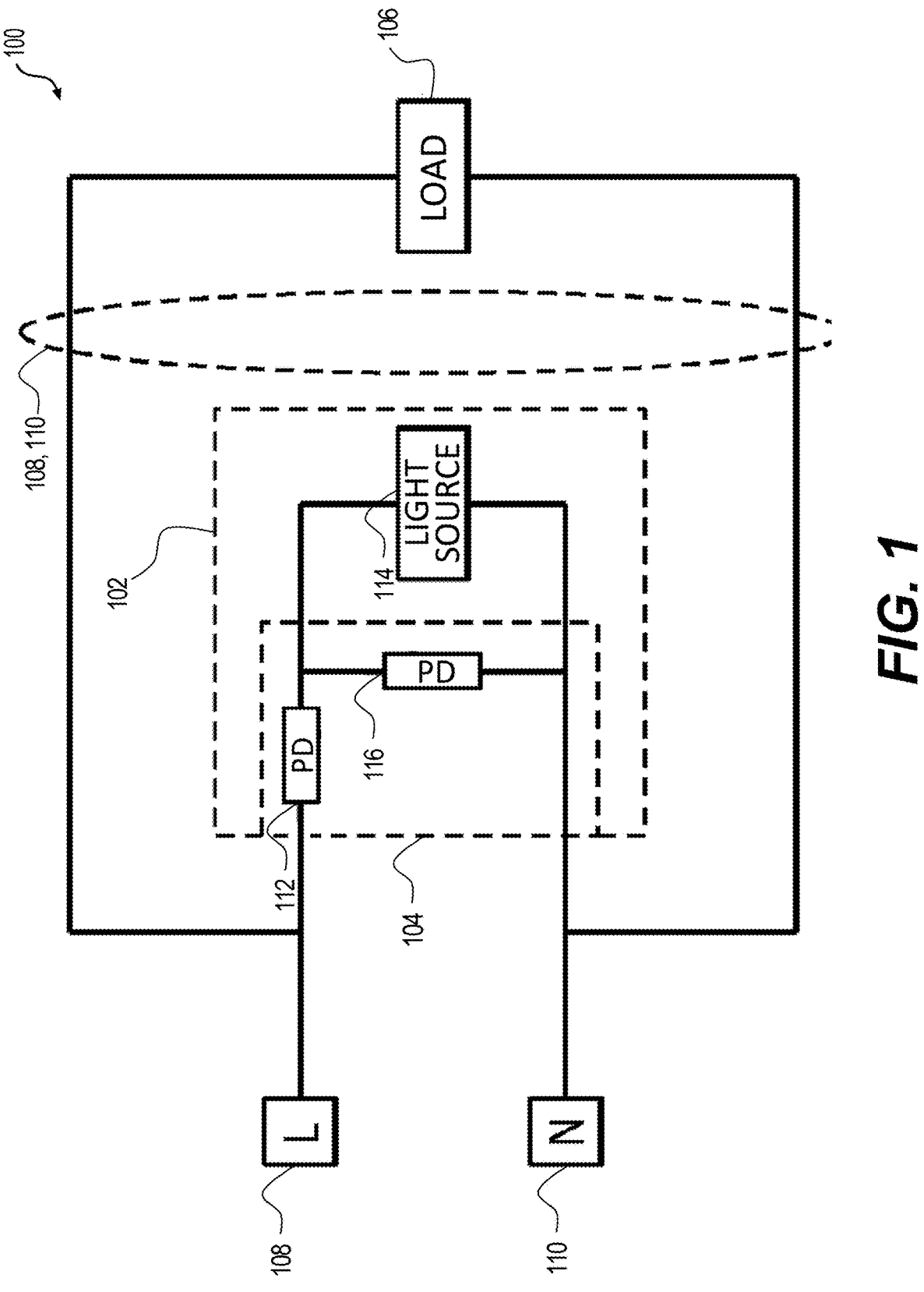
FIG. 1 illustrates an example schematic diagram of an electrical distribution system.

The present embodiments are directed to a device and system for optics-based remote monitoring of protection devices. In particular embodiments, the device may include a light source configured to emit light as an indication that an electrical protection device has operated. In one embodiment, the electrical protection device may be configured to operate in response to a fault condition detected on an energized conductor to which the electrical protection device may be electrically coupled. For example, in particular embodiments, the electrical protection device may include a fuse. In one embodiment, the fault condition may include an overcurrent fault condition or an overvoltage fault condition. In particular embodiments, the device may also include an optical device coupled to the light source and configured to channel the emitted light from a first end portion of the optical device to a second end portion of the optical device.

For example, in some embodiments, the light source may be coupled in parallel to the electrical protection device and the optical device may be coupled in series to the light source. In particular embodiments, the device may also include a photosensor optically coupled to the second end portion of the optical device and configured to detect the emitted light. For example, in one embodiment, the photosensor may include a photodiode, a photoresistor, or a phototransistor. In particular embodiments, the photosensor may be configured to detect the emitted light and to generate a first output signal based thereon. In particular embodiments, the device may also include a multiplexer communicatively coupled to the photosensor and configured to receive the first output signal from the photosensor, generate a second output signal based on the first output signal, and transmit the second output signal to one or more remote computing devices. For example, in one embodiment, the second output signal may include the indication that the electrical protection device has operated.

In particular embodiments, the device may include an electrical switch. For example, in some embodiments, the electrical switch may include one of a number of electrical switches configured to at least partially isolate the energized conductor from an electrical load. In particular embodiments, the electrical switch may include a preexisting electrical switch configured to be retrofitted to include the optical device and the photosensor. In particular embodiments, the electrical switch may include a fuse configured to operate in response to the fault condition detected on the energized conductor to which the fuse may be electrically coupled. In particular embodiments, the electrical switch may further include a light source associated with the fuse and configured to emit light as an indication that the fuse has operated, a light pipe coupled to the light source and configured to channel the emitted light from a first end portion of the light pipe to a second end portion of the light pipe, and a photosensor optically coupled to the second end portion of the light pipe and configured to detect the emitted light.

Technical advantages of particular embodiments of this disclosure may include one or more of the following. Certain systems and methods described herein provide a device and system for optics-based remote monitoring of protection devices. The device and system include an electrical fused switch, which includes a fuse and an open-fuse light source (e.g., neon lamp or other light indicator). The open-fuse light source (e.g., neon lamp or other light indicator) may be coupled to a light pipe that may be provided to channel emitted light from the light source to a photosensor. The photosensor may be provided to detect the emitted light as indication that the fuse has operated, and, by extension, that the fuse is suitable for replacement. The photosensor may then provide an output signal to a multiplexer and one or more remote computing devices to communicate that the respective fuse has operated and is now suitable for replacement.

In particular embodiments, by providing the light pipe and photosensor as an optics-based sensor kit of which the electrical fused switch may be retrofitted to include may provide an electrical switch device and system in which fuse operation status may be detected and communicated while providing electrical isolation between the high-voltage conductor and electrical load and the optics-based sensor kit. For example, the optics-based sensor kit may be installed in an electrical fused switch or any other electrical device in which remote lamp status may be required. In this way, any number of electrical fused switches configured within an electrical distribution panel may have their fuse status lamps detected and monitored with light pipes and mounted in proximity to an array of photosensors.

The array of photosensors may be implemented in a multiplexed sensing and processing scheme, such that all electrical fused switches are detected and monitored in real time or near real-time and their fuse operation statuses communicated to a single multiplexer and subsequently to one or more remote computing devices. In some embodiments, communication of the fuse operation status may be implemented by any of various wireless communication systems, such as Wi-Fi, Bluetooth, nearfield communication (NFC), or any of various industrial bus protocols such as MODBUS, Profibus, Ethernet/IP, and so forth. Further, by providing the optics-based sensor kit, the wiring complexity and electrical connectivity within the electrical fused switch may be reduced. Lastly, by providing the optics-based sensor kit, potential hazards associated measuring voltages across high-voltage energized conductors may also be reduced or eliminated.

Other technical advantages will be readily apparent to one skilled in the art from the following figures, descriptions, and claims. Moreover, while specific advantages have been enumerated above, various embodiments may include all, some, or none of the enumerated advantages.

EXAMPLE EMBODIMENTS

FIG. 1 illustrates an example schematic diagram of an electrical distribution system 100. As depicted, the electrical distribution system 100 may include an electrical switch 102 including a fault event protection system 104 as part of the electrical switch 102. The electrical switch 102 may be fed by an energized conductor or load-side live conductor 108 (e.g., "L"), and the electrical switch 102 may also be coupled to a ground conductor or neutral conductor 110 (e.g., "N"). Additionally, an electrical load 106 (e.g., a commercial site, an industrial site, or other facility) may be coupled to the electrical switch 102 via the live and neutral conductors 108, 110. Further, within the electrical switch 102, the fault event protection system 104 may include a first protection device 112 that may be coupled in series with a light source 114 and a second protection device 116 that may be coupled across the light source 114 and between the load-side live conductor 108 (e.g., "L") and the neutral conductor 110 (e.g., "N").

In particular embodiments, the light source 114 may include a neon lamp, a light-emitting diode (LED), an organic light-emitting diode (OLED), or other similar light-based indicator that may be suitable of indicating that one or more of the first protection device 112 or the second protection device 116 has operated. It should be appreciated that the embodiment of the electrical switch 102 as depicted by FIG. 1 may represent only one embodiment of the electrical switch 102. In another embodiment, the electrical switch 102 may not include the first protection device 112 that may be coupled in series with the light source 114, and instead include only the second protection device 116 that may be coupled across the light source 114 and between the load-side live conductor 108 (e.g., "L") and the neutral conductor 110 (e.g., "N"). In particular embodiments, the first protection device 112 and the second protection device 116 may each include a fuse that may be suitable for operating in response to a fault condition (e.g., overcurrent fault condition, overvoltage fault condition) detected on the load-side live conductor 108 (e.g., "L") to which the first protection device 112 and the second protection device 116 are electrically coupled.

Figure 2:
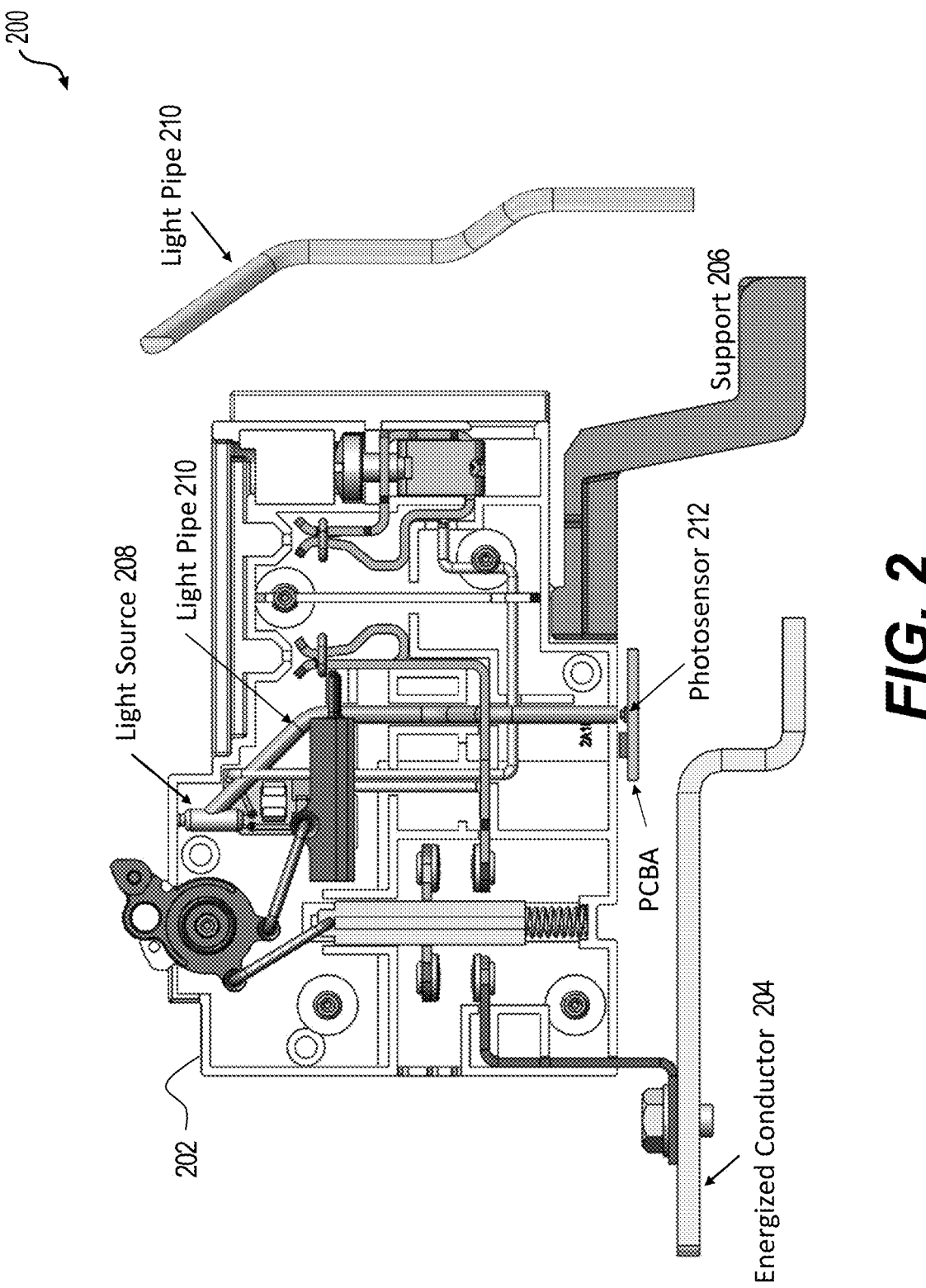
FIG. 2 illustrates an example electrical switch device including a light pipe and a photosensor.

FIG. 2 illustrates an example electrical switch device 200 including a light pipe and a photosensor, in accordance with the presently disclosed embodiments. In particular embodiments, the electrical switch 202 may be identical to the electrical switch 102 as discussed above with respect to FIG. 1. For example, as depicted, the electrical switch 202 may include a fuse and an open-fuse light source 208 and may be coupled to a high-voltage energized conductor 204 (e.g., load-side live conductor) and a support structure 206. In particular embodiments, the open-fuse light source 208 (e.g., neon lamp, LED, or OLED) may be coupled to a light pipe 210 that may be suitable for channeling emitted light from the open-fuse light source 208 to a photosensor 212. For example, in particular embodiments, the photosensor 212 may include a photodiode, a photoresistor, a phototransistor, or other similar light detection sensor that may be suitable for detecting the emitted light from the light source 208 and channeled through the light pipe 210 as indication that the fuse has operated, and, by extension, that the fuse is suited for replacement.

In particular embodiments, as will be further appreciated below with respect to FIG. 3, the photosensor 212 may then provide an output signal to a multiplexer and one or more remote computing devices to communicate that a respective fuse has operated and is now suited for replacement. In particular embodiments, by providing the light pipe 210 and the photosensor 212 as an optics-based sensor kit of which the electrical switch 202 may be retrofitted to include may provide an electrical switch device 200 in which fuse operation status may be detected and communicated while providing electrical isolation between the high-voltage energized conductor 204 and the optics-based sensor kit. Thus, the light pipe 210 and the photosensor 212 may be installed in the electrical switch 202 or any other electrical device in which remote lamp status may be required.

Figure 3:
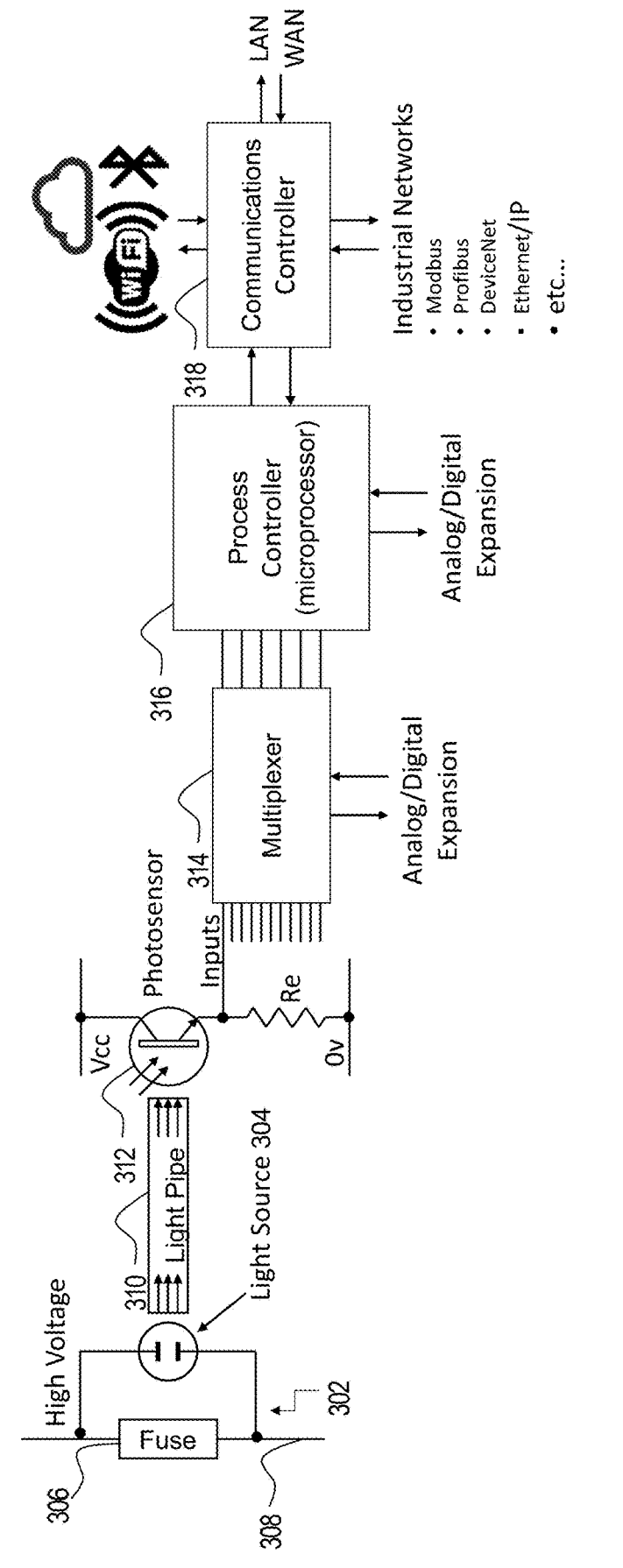
FIG. 3 illustrates an example schematic diagram of a device and system for optics-based remote monitoring of protection devices.

FIG. 3 illustrates an example schematic diagram of a device and system 300 for optics-based remote monitoring of protection devices, in accordance with the presently disclosed embodiments. As depicted, in particular embodiments, an electrical switch 302 may include a light source 304 (e.g., neon lamp, LED, or OLED) configured to emit light as an indication that a fuse 306 has operated. In one embodiment, the fuse 306 may be suitable for operating in response to a fault condition (e.g., overcurrent fault condition, overvoltage fault condition) detected on a high-voltage energized conductor 308 to which the fuse 306 may be electrically coupled. As further depicted, in particular embodiments, the device and system 300 may also include a light pipe 310 coupled to the light source 304 and configured to channel the emitted light from a first end of the light pipe 310 to a second end of the light pipe 310 to which a photosensor 312 may be optically coupled. In particular embodiments, the light source 304 may be coupled in parallel to the fuse 306 and the light pipe 310 may be coupled in series to the light source 304.

In particular embodiments, the photosensor 312 may include a photodiode, a photoresistor, a phototransistor, or other light detection sensor that may be suitable for detecting the emitted light and to generate a first output signal based thereon. In particular embodiments, as further depicted, the device and system 300 may also include a multiplexer 314 that may be communicatively coupled to the photosensor 312 and utilized to receive the first output signal from the photosensor 312, generate a second output signal based on the first output signal, and then transmit the second output signal to one or more remote computing devices 316, 318. For example, in one embodiment, the second output signal may include an indication that the fuse 306 has operated that may be provided to the remote computing devices 316, 318.

Thus, in accordance with the presently disclosed embodiments, the fuse 306 operation status may be detected and monitored by use of the light pipe 310 and photosensor 312 kit and communicated to the remote computing devices 316, 318 in an electrically isolated manner and without having to deploy field personnel to measure the voltage on the high-voltage energized conductor 308 or to personally observe the light source 304. For example, in some embodiments, the electrical switch 302 may be one of a large number of electrical switches 302 that may be installed within an electrical distribution panel (or several electrical distribution panels) at a commercial site, an industrial site, or other facility.

The present embodiments thus provide a mechanism to remotely detect and monitor fuse 306 operation statuses of the large number of electrical switches 302 and a multiplexed sensing and processing scheme in which an array of photosensors 312 each provide its fuse 306 operation status indications to a single multiplexer 314 (e.g., 4-channel MUX, 8-channel MUX, 64-channel MUX, 128-channel MUX, or N-channel MUX), which may be suitable for selecting between fuse 306 operation status indications and outputting the appropriate fuse 306 operation status information to be consumed by the remote computing devices 316, 318. In some embodiments, the communication of the fuse 306 operation status indications may be implemented by any of various wireless communication systems, such as Wi-Fi, Bluetooth, nearfield communication (NFC), or any of various industrial bus protocols such as MODBUS, Profibus, Ethernet/IP, and so forth.

Figure 4:
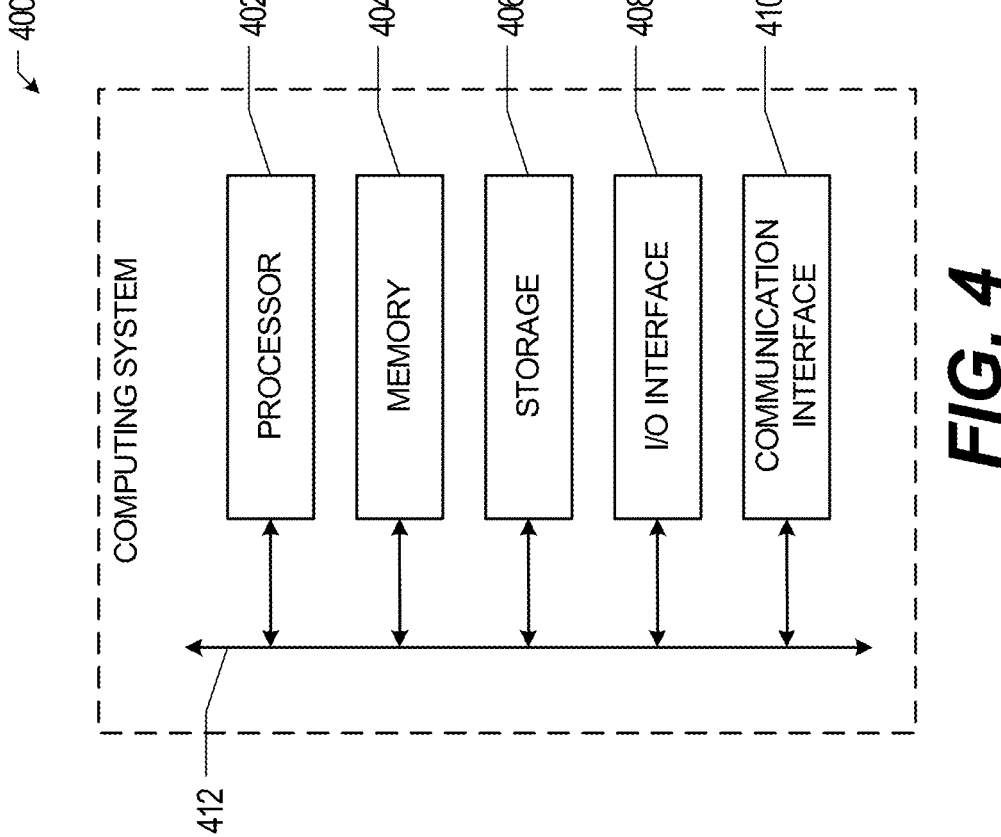
FIG. 4 illustrates an example computer system.

FIG. 4 illustrates an example computer system 400 that may be useful in performing one or more of the foregoing techniques as presently disclosed herein. In particular embodiments, one or more computer systems 400 perform one or more steps of one or more methods described or illustrated herein. In particular embodiments, one or more computer systems 400 provide functionality described or illustrated herein. In particular embodiments, software running on one or more computer systems 400 performs one or more steps of one or more methods described or illustrated herein or provides functionality described or illustrated herein. Particular embodiments include one or more portions of one or more computer systems 400. Herein, reference to a computer system may encompass a computing device, and vice versa, where appropriate. Moreover, reference to a computer system may encompass one or more computer systems, where appropriate.

This disclosure contemplates any suitable number of computer systems 400. This disclosure contemplates computer system 400 taking any suitable physical form. As example and not by way of limitation, computer system 400 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 400 may include one or more computer systems 400; be unitary or distributed; span multiple locations; span multiple machines; span multiple data centers; or reside in a cloud, which may include one or more cloud components in one or more networks. Where appropriate, one or more computer systems 400 may perform without substantial spatial or temporal limitation one or more steps of one or more methods described or illustrated herein.

As an example, and not by way of limitation, one or more computer systems 400 may perform in real time or in batch mode one or more steps of one or more methods described or illustrated herein. One or more computer systems 400 may perform at different times or at different locations one or more steps of one or more methods described or illustrated herein, where appropriate. In particular embodiments, computer system 400 includes a processor 402, memory 404, storage 406, an input/output (I/O) interface 408, a communication interface 410, and a bus 412. Although this disclosure describes and illustrates a particular computer system having a particular number of particular components in a particular arrangement, this disclosure contemplates any suitable computer system having any suitable number of any suitable components in any suitable arrangement.

In particular embodiments, processor 402 includes hardware for executing instructions, such as those making up a computer program. As an example, and not by way of limitation, to execute instructions, processor 402 may retrieve (or fetch) the instructions from an internal register, an internal cache, memory 404, or storage 406; decode and execute them; and then write one or more results to an internal register, an internal cache, memory 404, or storage 406. In particular embodiments, processor 402 may include one or more internal caches for data, instructions, or addresses. This disclosure contemplates processor 402 including any suitable number of any suitable internal caches, where appropriate. As an example, and not by way of limitation, processor 402 may include one or more instruction caches, one or more data caches, and one or more translation lookaside buffers (TLBs). Instructions in the instruction caches may be copies of instructions in memory 404 or storage 406, and the instruction caches may speed up retrieval of those instructions by processor 402.

Data in the data caches may be copies of data in memory 404 or storage 406 for instructions executing at processor 402 to operate on; the results of previous instructions executed at processor 402 for access by subsequent instructions executing at processor 402 or for writing to memory 404 or storage 406; or other suitable data. The data caches may speed up read or write operations by processor 402. The TLBs may speed up virtual-address translation for processor 402. In particular embodiments, processor 402 may include one or more internal registers for data, instructions, or addresses. This disclosure contemplates processor 402 including any suitable number of any suitable internal registers, where appropriate. Where appropriate, processor 402 may include one or more arithmetic logic units (ALUs); be a multi-core processor; or include one or more processors 602. Although this disclosure describes and illustrates a particular processor, this disclosure contemplates any suitable processor.

In particular embodiments, memory 404 includes main memory for storing instructions for processor 402 to execute or data for processor 402 to operate on. As an example, and not by way of limitation, computer system 400 may load instructions from storage 406 or another source (such as, for example, another computer system 400) to memory 404. Processor 402 may then load the instructions from memory 404 to an internal register or internal cache. To execute the instructions, processor 402 may retrieve the instructions from the internal register or internal cache and decode them. During or after execution of the instructions, processor 402 may write one or more results (which may be intermediate or final results) to the internal register or internal cache.

Processor 402 may then write one or more of those results to memory 404. In particular embodiments, processor 402 executes only instructions in one or more internal registers or internal caches or in memory 404 (as opposed to storage 406 or elsewhere) and operates only on data in one or more internal registers or internal caches or in memory 404 (as opposed to storage 406 or elsewhere).

One or more memory buses (which may each include an address bus and a data bus) may couple processor 402 to memory 404. Bus 412 may include one or more memory buses, as described below. In particular embodiments, one or more memory management units (MMUs) reside between processor 402 and memory 404 and facilitate accesses to memory 404 requested by processor 402. In particular embodiments, memory 404 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 404 may include one or more memories 404, where appropriate. Although this disclosure describes and illustrates particular memory, this disclosure contemplates any suitable memory.

In particular embodiments, storage 406 includes mass storage for data or instructions. As an example, and not by way of limitation, storage 406 may include a hard disk drive (HDD), a floppy disk drive, flash memory, an optical disc, a magneto-optical disc, magnetic tape, or a Universal Serial Bus (USB) drive or a combination of two or more of these. Storage 406 may include removable or non-removable (or fixed) media, where appropriate. Storage 406 may be internal or external to computer system 400, where appropriate. In particular embodiments, storage 406 is non-volatile, solid-state memory. In particular embodiments, storage 406 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 406 taking any suitable physical form. Storage 406 may include one or more storage control units facilitating communication between processor 402 and storage 406, where appropriate. Where appropriate, storage 406 may include one or more storages 406. Although this disclosure describes and illustrates particular storage, this disclosure contemplates any suitable storage.

In particular embodiments, I/O interface 408 includes hardware, software, or both, providing one or more interfaces for communication between computer system 400 and one or more I/O devices. Computer system 400 may include one or more of these I/O devices, where appropriate. One or more of these I/O devices may enable communication between a person and computer system 400. As an example, and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 408 for them. Where appropriate, I/O interface 408 may include one or more device or software drivers enabling processor 402 to drive one or more of these I/O devices. I/O interface 408 may include one or more I/O interfaces 408, where appropriate. Although this disclosure describes and illustrates a particular I/O interface, this disclosure contemplates any suitable I/O interface.

In particular embodiments, communication interface 410 includes hardware, software, or both providing one or more interfaces for communication (such as, for example, packet-based communication) between computer system 400 and one or more other computer systems 400 or one or more networks. As an example, and not by way of limitation, communication interface 410 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 410 for it.

As an example, and not by way of limitation, computer system 400 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 400 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 400 may include any suitable communication interface 410 for any of these networks, where appropriate. Communication interface 410 may include one or more communication interfaces 410, where appropriate. Although this disclosure describes and illustrates a particular communication interface, this disclosure contemplates any suitable communication interface.

In particular embodiments, bus 412 includes hardware, software, or both coupling components of computer system 400 to each other. As an example and not by way of limitation, bus 412 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 412 may include one or more buses 412, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A device, comprising:
an electrical protection device configured to operate in response to a fault condition detected on an energized conductor to which the electrical protection device is electrically coupled, wherein the fault condition comprises an overcurrent or an overvoltage fault condition;
a light source configured to emit light in response to the electrical protection device being triggered to operate;
an optical device coupled to the light source and configured to channel the light emitted by the light source from a first end portion of the optical device to a second end portion of the optical device; and
a photosensor optically coupled to the second end portion of the optical device and configured to detect the emitted light and to generate a first output signal to inform one or more remote computing devices that the electrical protection device has operated.

2. The device of claim 1, wherein the light source is coupled in parallel to the electrical protection device, and wherein the optical device is coupled in series to the light source.

3. The device of claim 1, the device further comprising:
a multiplexer communicatively coupled to the photosensor and configured to:
receive the first output signal from the photosensor;
generate a second output signal based on the first output signal; and transmit the second output signal to the one or more remote computing devices, the second output signal comprising an indication that the electrical protection device has operated.

4. The device of claim 1, wherein the photosensor comprises a photodiode, a photoresistor, or a phototransistor.

5. The device of claim 1, wherein the device comprises an electrical switch.

6. The device of claim 5, wherein the electrical switch comprises one of a plurality of electrical switches configured to at least partially isolate the energized conductor from an electrical load.

7. The device of claim 5, wherein the electrical switch comprises a preexisting electrical switch configured to be retrofitted to include the optical device and the photosensor.

8. The device of claim 1, wherein the electrical protection device comprises a fuse.

9. A system, comprising:
an electrical distribution panel, comprising:
a plurality of electrical protection devices each configured to operate in response to a fault condition detected on an energized conductor to which the each of the plurality of electrical protection devices is electrically coupled, wherein the fault condition comprises an overcurrent or an overvoltage fault condition;
a plurality of light sources each configured to emit light in response to a respective electrical protection device of the plurality of electrical protection devices being triggered to operate;
a plurality of optical devices each coupled to a respective light source of the plurality of light sources and configured to channel the light emitted by the respective light source from a first end portion of the optical device to a second end portion of the optical device; and
at least one photosensor optically coupled to the second end portion of the each optical device and configured to detect the emitted light and to generate a first output signal to inform one or more remote computing devices that a respective electrical protection device has operated.

10. The system of claim 9, wherein the plurality of light sources is coupled in parallel to the plurality of electrical protection devices, and wherein the plurality of optical devices is coupled in series to the plurality of light sources.

11. The system of claim 9, the system further comprising:
a multiplexer communicatively coupled to the at least one photosensor and configured to:
receive the first output signal from the at least one photosensor;
generate a second output signal based on the first output signal; and
transmit the second output signal to the one or more remote computing devices, the second output signal comprising an indication that a respective electrical protection device has operated.

12. The system of claim 9, wherein the at least one photosensor comprises a photodiode, a photoresistor, or a phototransistor.

13. The system of claim 9, wherein the electrical distribution panel is configured to enclose a plurality of electrical switches.

14. The system of claim 13, wherein the plurality of electrical switches is configured to at least partially isolate the energized conductor from an electrical load.

15. The system of claim 13, wherein the plurality electrical switches comprise a plurality of preexisting electrical switches configured to be retrofitted to include the plurality of optical devices and the at least one photosensor.

16. The system of claim 9, wherein the plurality of electrical protection devices comprises a fuse.

17. An electrical switch, comprising:

a fuse configured to operate in response to a fault condition detected on an energized conductor to which the fuse is electrically coupled, wherein the fault condition comprises an overcurrent or an overvoltage fault condition;

a light source onfigured to emit light in response to the fuse being triggered to operate;

a light pipe coupled to the light source and configured to channel the light emitted by the light source from a first end portion of the light pipe to a second end portion of the light pipe; and a photosensor optically coupled to the second end portion of the light pipe and configured to detect the emitted light and to generate a first output signal to inform one or more remote computing devices that the fuse has operated.

18. The electrical switch of claim 17, further comprising an electrical distribution panel, wherein the electrical distribution panel is configured to enclose the electrical switch.

\* \* \* \* \*